United States Patent
Hartman et al.

(10) Patent No.: US 7,358,202 B2
(45) Date of Patent: Apr. 15, 2008

(54) INFUSION FABRIC FOR MOLDING LARGE COMPOSITE STRUCTURES

(75) Inventors: David R. Hartman, Granville, OH (US); Matthew W. Dunn, Lewisville, NC (US)

(73) Assignee: OCV Intellectual Capital, LLC DE (US)

( * ) Notice: Subject to any disclaimer, the term of this patent is extended or adjusted under 35 U.S.C. 154(b) by 190 days.

(21) Appl. No.: 10/971,286

(22) Filed: Oct. 22, 2004

(65) Prior Publication Data
US 2006/0089068 A1  Apr. 27, 2006

(51) Int. Cl.
B32B 5/12 (2006.01)
B32B 5/08 (2006.01)
B32B 5/26 (2006.01)
D03D 15/00 (2006.01)

(52) U.S. Cl. ............. 442/246; 442/189; 442/247; 442/268; 442/269; 442/277; 428/107; 428/109; 428/114

(58) Field of Classification Search .......... 524/451, 524/604, 599; 525/437, 447; 428/107, 109, 428/114; 442/189, 246, 247, 268, 269, 277
See application file for complete search history.

(56) References Cited

U.S. PATENT DOCUMENTS

| | | |
|---|---|---|
| 2,448,585 A * | 9/1948 | Fuller .................... 525/447 |
| 3,936,558 A | 2/1976 | Bolen et al. |
| 4,006,272 A * | 2/1977 | Sakaguchi et al. ........ 442/180 |
| 4,407,885 A | 10/1983 | Murphy et al. |
| 4,410,385 A | 10/1983 | Murphy et al. |
| 4,547,421 A | 10/1985 | Dunbar |
| 4,567,076 A | 1/1986 | Therrien |
| 4,699,942 A * | 10/1987 | Weaver et al. .......... 524/338 |
| 5,055,242 A | 10/1991 | Vane |
| 5,085,928 A | 2/1992 | Krueger |
| 5,431,995 A | 7/1995 | Narita et al. |
| 5,445,693 A * | 8/1995 | Vane .................... 156/93 |
| 5,809,805 A | 9/1998 | Palmer et al. |
| 5,910,458 A | 6/1999 | Beer et al. |
| 6,203,749 B1 | 3/2001 | Loving |
| 6,268,047 B1 | 7/2001 | Mulder et al. |
| 6,508,974 B1 | 1/2003 | Loving |
| 6,656,411 B1 | 12/2003 | McClure et al. |
| 6,680,115 B2 | 1/2004 | Mulder et al. |
| 2002/0090874 A1 | 7/2002 | McKaque, Jr. et al. |
| 2003/0077965 A1 | 4/2003 | Mack et al. |
| 2003/0102604 A1 | 6/2003 | Mack et al. |
| 2003/0119398 A1 | 6/2003 | Bogdanovich et al. |
| 2003/0211792 A1 | 11/2003 | Lane et al. |
| 2004/0005435 A1 | 1/2004 | GagaRao et al. |

FOREIGN PATENT DOCUMENTS

DE  4403977  8/1994

(Continued)

OTHER PUBLICATIONS

Reichhold—Pretex® 110-20 (product description).

*Primary Examiner*—Jenna-Leigh Johnson
(74) *Attorney, Agent, or Firm*—Inger H. Eckert; Margaret S. Millikin

(57) ABSTRACT

An infusion fabric includes a mat selected from a group consisting of continuous filament mat, direct chopped mat, direct continuous mat and combinations thereof and a woven roving or bonded reinforcement layer. The mat and woven roving reinforcement layer are stitched together. The continuous filament mat includes E-glass and/or ECR-glass fibers, a binder and a size.

54 Claims, 2 Drawing Sheets

FOREIGN PATENT DOCUMENTS

| | | |
|---|---|---|
| JP | 6226872 | 8/1994 |
| JP | 2002120315 | 4/2002 |
| NL | 9201598 | 4/1994 |
| WO | WO 98/42904 | 10/1998 |

\* cited by examiner

INFUSION FABRIC FOR MOLDING LARGE COMPOSITE STRUCTURES

TECHNICAL FIELD AND INDUSTRIAL APPLICABILITY OF THE INVENTION

This invention relates generally to an infusion fabric that may be molded into large composite structures as well as to a novel continuous filament mat and a novel binder.

BACKGROUND OF THE INVENTION

Reinforcement fabrics made from fibrous materials formed into woven, knitted and non-woven material, are well known in the art. Yarns of glass, carbon and aramid are typically formed into fabrics, and a plurality of layers of fabric are stacked and cut into dry fabric kits or performs. The performs are then infused or impregnated with a resin binder and cured to form a rigid composite.

Typically a glass reinforced fibrous mat is preformed and then placed in a mold for molding into a fiber-reinforced article. Glass fiber-reinforcement mats are used in situations where a desired strength is necessary, such as in truck fenders, auto chassis or bus components and the like. For example, layers of the continuous strand mat and layers of unidirectional or multidirectional reinforcement material are fabricated separately. These layers are individually placed in a set of preformed screens, which generally consist of an upper screen and a lower screen. The upper and lower screens are moved together in order to conform the layers to the shape of the preformed screens. The layers are thus shaped into what is known as a preform. The preform is then placed in a mold and injected with a suitable resinous material to make the fiber reinforced article.

U.S. patent application Ser. No. 10/674,987, filed on Sep. 30, 2003, (OC Case No. 25253) now U.S. Pat. No. 7,168,272, issued on Jan. 30, 2007, owned by the assignee of the present invention, discloses a crimp-free infusible reinforcement fabric. The unidirectional fabric has small size tows spaced between large size tows. The "channels" that are formed from the small tows between the larger tows permit faster resin infusion and increased productivity.

The present invention relates to an improved infusion fabric that better optimizes knitting, preforming, conformability to tooling, resin infusion rate, consolidation thickness, surface aesthetics, and composite structural performance in a range of closed molding processes including VIP, RTM and RTM Lite or VARTM processes. This represents the full range of composite closed molding processes used by marine, wind, construction, transportation and industrial customers. In addition, the present invention relates to a novel continuous filament mat and binder useful in making that improved infusion fabric mat.

SUMMARY OF THE INVENTION

The infusion fabric comprises a mat selected from a group consisting of continuous filament mat, direct chopped mat, direct continuous mat and combinations thereof along with a woven or bonded reinforcement layer. In one possible embodiment the mat and woven roving or bonded reinforcement layer are stitched together.

More specifically describing the invention, the mat is constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid fibers, ceramic fibers, thermoplastic polymer fibers and mixtures thereof. Natural fibers such as, for example, cotton, kenaf, sisal and jute may also be used alone or in combination with any of the above. The woven roving reinforcement layer may also be constructed from the same list of materials.

Typically the woven roving reinforcement layer has an areal weight of between about 8 to about 60 oz/sq. yd. Further, the woven roving reinforcement layer is selected from a group consisting of plain, twill and satin style. The woven roving reinforcement layer can include multiple parallel tows at least two tows of which have differing yields so as to form spaced channels. Typically a first tow of the two tows has a yield A of between about 750 to about 2500 yds/lb. and a second tow of said two tows has a yield B of between about 52 to about 450 yds/lb.

In accordance with still another possible embodiment of the present invention the infusion fabric may include a surfacing mat. The mat is sandwiched between the surfacing mat and the woven roving reinforcement layer.

In accordance with one particular embodiment of the present invention, the mat of the infusion fabric is a continuous filament mat including E-glass fibers and/or ECR-glass fibers, a binder and a size. More specifically, this continuous filament mat includes between about 80 and about 99 weight percent glass fibers, between about 1 and about 20 weight percent binder and between about 0.01 and about 1 weight percent size on the fiber. The glass fibers are provided as glass filament bundles. The glass filament bundles include between about 20 to about 140 filaments per bundle. Each filament has a mean diameter of between about 11 to about 26 microns. The bundle diameter is between about 0.127 to about 3.175 mm. The loop formation ratio ranges from about 2.0 to about 8.0.

The binder is a polyester or an epoxy compatible binder such as epoxy resin and epoxy novolak. The polyester binder is ground to a particle size of between about 25 to about 200 mm. The binder also includes talc and benzoyl peroxide. More specifically, the binder includes between about 92.5 and about 99.9 weight percent polyester, between about 0.01 and about 5 weight percent talc and between about 0.1 and about 2.5 weight percent benzoyl peroxide.

Still further, the continuous filament mat has a degree of cure expressed as acetone extractables of between about 50 and about 100 percent. More typically, the continuous filament mat has a degree of cure expressed as acetone extractables of between about 60 and about 90 percent.

In accordance with yet another aspect of the present invention, a continuous filament mat is provided. The continuous filament mat comprises E-glass fibers and/or ECR-glass fibers, a binder and a size. The continuous filament mat includes between about 90 and about 98 weight percent E-glass or ECR-glass fibers, between about 2 and about 10 weight percent binder and between about 0.1 and about 1.0 weight percent size on the fiber. The glass fibers are provided as glass filament bundles. The glass filament bundles include between about 20 to about 140 filaments per bundle. Each filament has a mean diameter of between about 11 and about 26 microns. The bundle diameter is between about 0.127 and about 3.175 mm. The loop formation ratio ranges from about 2.0 to about 8.0. The cure, measured as acetone extractables, is between about 50 and about 100 percent and more typically between about 60 and about 90 percent.

In a particularly useful embodiment, the continuous filament mat includes E-glass or ECR-glass fiber bundles having between about 44 to about 50 filaments per bundle or loop strand. The bundle diameter mean is about 0.3048 mm and the range is from about 0.127 to about 1.27 mm. The strand to mat architecture or loop formation ratio is between about 6.0 and 6.6.

In accordance with still another aspect of the present invention, a binder is provided for preparing a glass fiber mat. The binder comprises between about 95 and about 99.8 weight percent polyester, between about 0.05 and about 3 weight percent talc and between about 0.2 and about 2 weight percent benzoyl peroxide. The polyester binder is ground to a particle size of between about 25 to about 200 mm. The polyester is based upon ethylene glycol and fumaric acid.

In the following description there is shown and described several different embodiments of this invention, simply by way of illustration of some of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings.

Reference will now be made in detail to the present preferred embodiment of the invention, an example of which is illustrated in the accompanying drawings.

DETAILED DESCRIPTION AND PREFERRED EMBODIMENTS OF THE INVENTION

Figure 1:
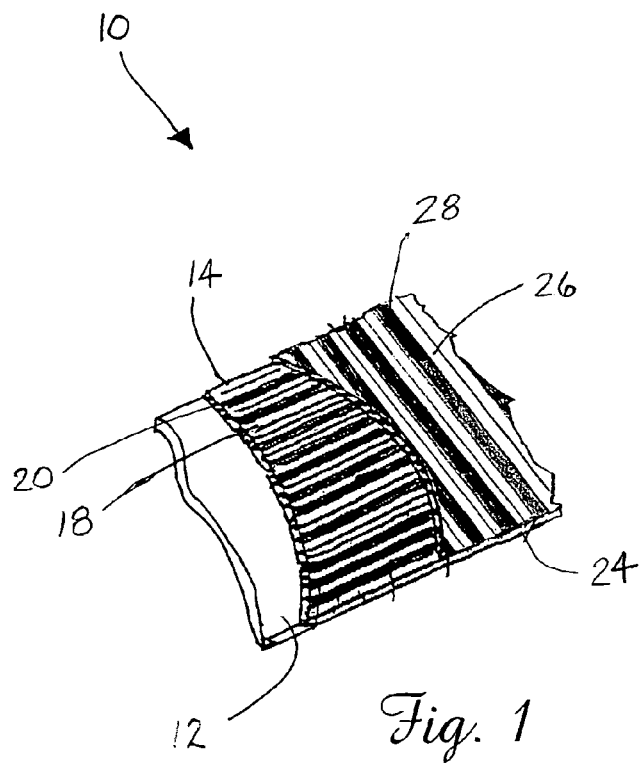
FIG. 1 is a partially sectional perspective view of one possible embodiment of the infusion fabric of the present invention.
Figure 1A:
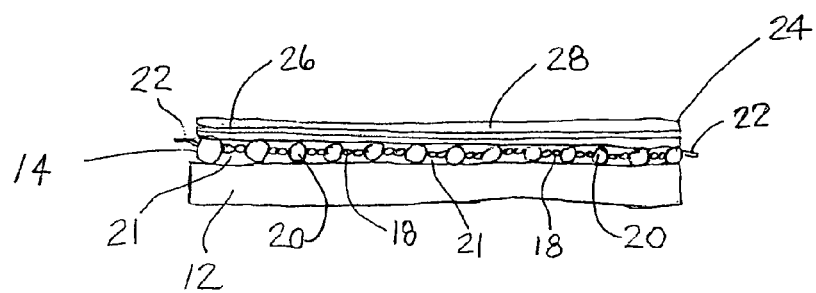
FIG. 1a is a full cross sectional view of the infusion fabric illustrated in FIG. 1.

A first embodiment of the infusion fabric 10 of the present invention is illustrated in FIGS. 1 and 1a. As illustrated the infusion fabric 10 includes a mat 12 and a woven roving or bonded reinforcement layer 14. Both the mat 12 and the woven roving reinforcement layer 14 may be constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid, ceramic fibers, thermoplastic polymer fibers, natural fibers (e.g. cotton, kenaf, sisal, jute) and mixtures thereof. Of course, the mat 12 and woven roving reinforcement layer 14 may be constructed from the same or different materials from this list as desired.

The woven roving reinforcement layer 14 has an areal weight of between about 8 to about 60 oz/sq. yd. The woven roving reinforcement layer 14 is selected from a group consisting of plain, twill and satin style. The woven roving or bonded reinforcement layer 14 also includes multiple parallel tows 18, 20 at least two tows of which have differing yields so as to form spaced channels 21. The first tow 18 of the two tows has a yield A of between about 750 to about 2500 yds/lb. The second tow 20 of the two tows has a yield B of between about 52 to about 450 yds/lb. By placing one or more of the smaller first tows 18 between two or more of the larger second tows 20, a channel 21 is provided. A typical woven roving reinforcement layer 14 includes a group of these channels 21 that allow rapid infusion of resin across the infusion fabric 10 during the molding process.

The spacing of the tows 18, 20 is typically determined by the resin utilized in the molding process. More specifically, a more viscous resin requires a greater number of channels per surface area in order to better enhance the flow of resin during the molding process. Alternatively, a less viscous resin flows more easily and requires fewer channels per surface area. In such a situation a fewer number of small tows 18 are required between a larger number of large tows 20.

The woven roving or bonded reinforcement layer 14 typically includes unidirectional fiber orientation. Various methods may be utilized to maintain the primary fibers in position in the unidirectional layer. Those methods include weaving, stitching and bonding as is known in the art. In one particularly useful embodiment the layer 14 is constructed from crimp-free warped knitted fabric otherwise known as stitch-bonded fabric. In the illustrated embodiment, the tows 18 and 20 of the woven roving or bonded reinforcement layer 14 are held in place by a secondary, non-structural stitching thread 22. This may typically be a polyester thread or any other thread conventionally used in the art.

The mat 12 and woven roving or bonded reinforcement layer 14 are connected together by any appropriate means. In the illustrated embodiment the connection is completed by stitch-bonding using conventional stitch-bonding techniques and styles such as chain, tricot, modified tricot or promat. Conventional machines known in the art such as Liba stitch-bonding machines may be used for this purpose.

As also illustrated in FIGS. 1 and 1a, the infusion fabric 10 may also include a second woven roving or bonded reinforcement layer 24. The second woven roving reinforcement layer 24 has a structure similar to the first woven roving reinforcement layer 14: that is, the second woven roving or bonded reinforcement layer includes multiple parallel tows 26, 28 at least two tows of which have differing yields so as to form spaced channels for resin infusion. The tows 26, 28 do not have to have identical yields to the tows 18, 20 in the first woven roving reinforcement layer 14. It should be appreciated, however, that the tows 18, 20 of the first woven roving reinforcement layer 14 extend in a first direction while the tows 26, 28 of the second woven roving reinforcement layer 24 extend in a second direction at a bias to the first direction. Typically that bias is one of approximately 90 degrees. This structural arrangement adds additional strength to the infusion fabric 10.

Figure 2:
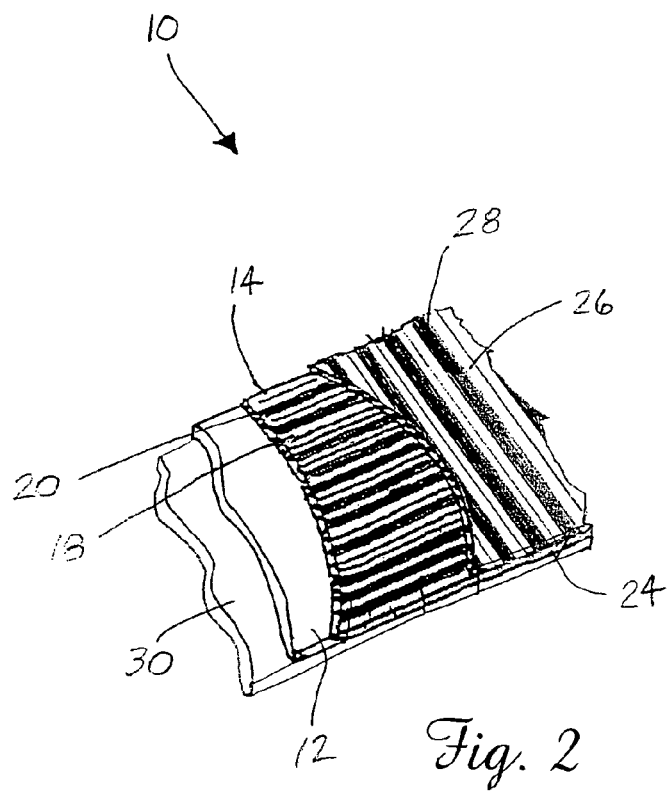
FIG. 2 is a partially sectional perspective view of another possible embodiment of the infusion fabric of the present invention.
Figure 2A:
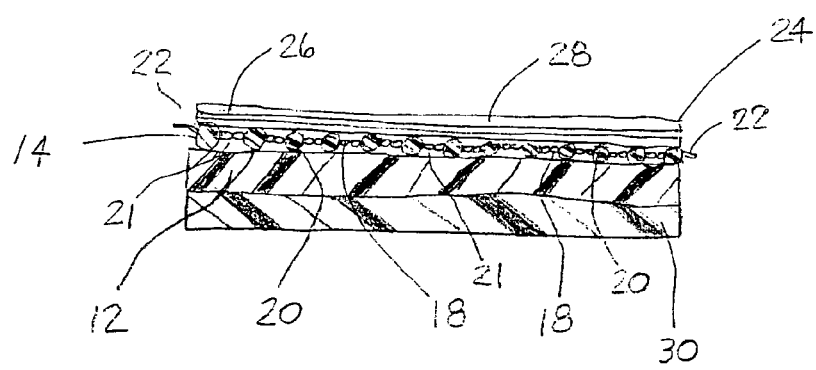
FIG. 2a is a full cross sectional view of the infusion fabric illustrated in FIG. 2.

An alternative embodiment for the infusion fabric 10 is illustrated in FIGS. 2 and 2a. This embodiment includes a mat 12 and a woven roving or bonded reinforcement layer 14 substantially identical to that described above with respect to the FIG. 1 embodiment. In addition, the infusion fabric 10 includes a surfacing mat 30. The surfacing mat 30 is connected to the face of the mat 12 opposite the woven roving reinforcement layer 14 so that the mat 12 is sandwiched between the surfacing mat 30 and the woven roving reinforcement layer 14. The surfacing mat 30 is formed from a print blocking media such as another continuous fiber mat or a veil incorporating glass fibers, polyester fibers, natural fibers (e.g. cotton, kenaf, sisal, jute), polymer particles and binder. The surfacing mat 30 may, for example, be connected to the mat 12 by spin bonding, wet bonding, dry bonding and needle punching.

As previously noted, the mat 12 may be a continuous filament mat. For purposes of this document, "continuous filament" is defined as a collimated assembly of individual fibers treated, sized or finished appropriately for wetting and adhering resin or polymer upon composite consolidation.

Also for purposes of this document, a "continuous filament mat" is defined as a random swirl placement of continuous bundled fibers which has orientation defined by the loop formation ratio in the process creating a mat with planar isotropy. A useful continuous filament mat 12 is made utilizing a loop formation ratio of between about 2.0 to about 8.0 and typically between about 6.0 and 6.6 (loop formation ratio is strand or bundle speed/oscillation rate).

A continuous filament mat 12 particularly useful in the present invention also includes E-glass and/or ECR-glass fibers, a binder and a size. The glass fibers are provided as glass filament bundles. The glass filament bundles include between about 20 to about 140 filaments per bundle. Each filament has a mean diameter of between about 11 and about 26 microns. The bundle diameter is between about 0.127 and about 3.175 mm.

In a particularly useful embodiment, the mean filament diameter is between about 17.0 and about 20.0 microns. Further, there are between about 44 and about 50 filaments per bundle or loop strand. The strand or bundle diameter mean is about 0.3048 mm and the bundle diameter falls in an overall range of between about 0.127 to about 1.27 mm. The strand to mat architecture or preferred loop formation ratio is between about 6.0 and about 6.6.

The binder is a polyester or an epoxy compatible binder such as a powdered epoxy resin or an epoxy novolak. Epoxy resins include those made from epichlorohydrin and bisphenol A. Epoxy novolaks include resins made by reaction of epichlorohydrin with a novolak resin (phenol-formaldehyde).

In one possible embodiment that polyester binder is based upon ethylene glycol and fumaric acid. The binder also includes talc and benzoyl peroxide. For a typical application the binder is ground to a particle size of between about 25 to about 200 mm. The talc is added as a crystallization enhancer. The binder is prepared by cryogenically grinding the crystalline polymer with a little zinc stearate to the desired particle size. The powder is then dry blended with the benzoyl peroxide. More specifically describing the binder, the binder includes between about 95 to about 99.8 weight percent polyester, between about 0.05 to about 3 weight percent talc and between about 0.2 to about 2 weight percent benzoyl peroxide.

The size utilized in the continuous filament mat 12 includes one or more formulations incorporating water, acetic acid, silane, and a biocide. Silane coupling agents useful in the present invention include but are not limited to A-187, A-171, A-174 and A-1100 silane available from General Electric Silanes. Lubricants useful in the present invention include but are not limited to Cirrosol 185AE and 185AN, each manufactured and sold by ICI America and Omega 16407. Biocides useful in the present invention include but are not limited to quaternary ammonium compounds containing bis/tributyltinoxide. One such biocide is sold under the trademark Biomet 66 and is available from Atochem.

The continuous filament mat 12 is manufactured by transporting glass filament bundles through the binder application process on a conveyor chain. A portion of the conveyor chain is supported within an open-ended trough called a flood pan. The purpose of the flood pan is to allow sufficient slurry to accumulate and fully submerse the non-woven web for some period of time. The slurry is fed from a reservoir located above and toward the inlet end of the flood pan (i.e. the curtain coder). The reservoir discharges the slurry through its slot on the lowermost portion of the reservoir. The reservoir and slot extend across the width of the floor pan. The major axes of the reservoir and slot are oriented perpendicular to the machine direction (major axis) on the process conveyor.

The slurry is discharged vertically down from the reservoir slot, in a continuous curtain, toward the upper surface of the non-woven web of glass strands. The velocity of the curtain of slurry is a function of the discharge velocity of the slurry from the reservoir slot, the vertical distance between the slot and the surface of the web and the viscosity of the slurry.

The non-woven web of glass strands and the conveyor chain are substantially permeable to the flow of the slurry, allowing the slurry to flow easily around both the glass strands and the conveyor chain wires and down to the impermeable flood pan. When the vertical slurry flow from the reservoir impinges on the flat surface of the flood pan (perpendicular to the surface of the flood pan), the flow is redirected to a horizontal flow. The flow of slurry upon interacting with the web, conveyor chain and flood pan, is generally redirected to flow in the same direction as the conveyor and web. The removal rate of the slurry from the flood pan is a function of the supply rate of slurry into the flood pan, the thickness of the conveyor chain, the drag of the chain and the slurry, the viscosity of the slurry, depth of slurry in the flood pan and other factors. The volumetric flow of slurry supplied by the reservoir is, by design, sufficient to ensure the web is fully submerged as it is carried through the majority of the length of the flood pan. The slurry flows through the glass strands and leaves a binder deposit which is subsequently cured in the oven into a bound mat structure.

In order for the continuous filament mat 12 to allow the desired resin infusion, the glass fiber bundles must not be too large or too close together. Both these aspects affect the openness or permeability of the mat construction for purposes of resin infusion. Continuous filament mats 12 useful in the present invention include but are not limited to CFM 8610, CFM 8620, CFM 8630, CFM 8635, CFM 8636 and CFM 8643, commercially available from the assignee of the present invention.

Factors influencing resin infusion for RTM, RTM lite or VIP processes follow Darcy's law on the need to reduce resin viscosity and increase mat/fabric in-plane permeability. Continuous filament mat permeability to balance resin infusion with mold conformability has been shown to improve with reduced filamentization, proper solids and cure of the binder. The random swirl of the mat, continuous fiber and proper sizing/binder chemistry allow good composite mechanical and structural performance. For purposes of this document cure is measured as acetone extractables. The continuous filament mat has a cure of between about 50 to about 100 percent and more typically about 60 to about 90 percent as measured by acetone extractables.

The various embodiments of the infusion fabric 10 of the present invention including those illustrated in FIGS. 1 and 2 are particularly useful in molding processes where resin must move through a fabric to create a consolidated composite. One particular process is resin transfer molding (RTM). Resin transfer molding (RTM) is a process by which a resin is pumped at low viscosities and low pressures into a closed mold die set containing a preform of dry fabric, i.e., fabric 10 to infuse resin into the preform and to make a fiber-reinforced composite part. The RTM process can be used to produce at low cost composite parts that are complex in shape. These parts typically require continuous fiber reinforcement along with inside mold line and outside mold line controlled surfaces. The ability to include and place continuous fiber reinforcement in large and small structures sets RTM apart from other liquid molding processes.

The fabric 10 is also useful in a vacuum assisted resin transfer molding (VARTM) system. In VARTM, the preform is covered by a flexible sheet or liner, such as fabric 10. The flexible sheet or liner is clamped onto the mold to seal the preform in an envelope. A catalyzed matrix resin is then introduced into the envelope to wet the preform. A vacuum is applied to the interior of the envelope via a vacuum line to collapse the flexible sheet against the preform. The vacuum draws the resin through the preform and helps to avoid the formation of air bubbles or voids in the finished article. The matrix resin cures while being subjected to the vacuum. The application of the vacuum draws off any fumes produced during the curing process. The fabric 10 of the present invention is useful in standard vacuum infusion molding processes as well as processes where the reinforced fabric is under vacuum.

In summary, numerous benefits are provided by the fabric 10 of the present invention. The fabric 10 is characterized by excellent handling qualities, ease of use and unsurpassed resin permeability. The faster flow rate allows for higher production and mold turnover, while potentially decreasing cost by eliminating local resin distribution media. Further, VOC loss to the environment is reduced. In addition, laminate bulk can be built with minimal labor and cost.

The foregoing description of the preferred embodiments of the invention have been presented for purposes of illustration and description. It is not intended to be exhaustive or to limit the invention to the precise form disclosed. Obvious modifications or variations are possible in light of the above teachings.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment do not and are not intended to limit the ordinary meaning of the claims and their fair and broad interpretation in any way.

What is claimed:

1. An infusion fabric, comprising:
    a mat selected from the group consisting of a continuous filament mat, a direct chopped mat, a direct continuous mat and combinations thereof; and
    a woven roving or bonded reinforcement layer, said woven roving or bonded reinforcement layer including multiple parallel tows;
        wherein at least two of said tows of have differing yields so as to form spaced channels.

2. The infusion fabric of claim 1, wherein said mat and said woven roving or bonded reinforcement layer are stitched together.

3. The infusion fabric of claim 1, wherein said mat is constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid, ceramic fibers, thermoplastic polymer fibers, natural fibers and mixtures thereof.

4. The infusion fabric of claim 1, wherein said woven roving or bonded reinforcement layer is constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid, ceramic fibers, thermoplastic polymer fibers, natural fibers and mixtures thereof.

5. The infusion fabric of claim 4, wherein said woven roving or bonded reinforcement layer has an areal weight of between about 8 to about 60 ounces per square yard.

6. The infusion fabric of claim 5, wherein said woven roving or bonded reinforcement layer is selected from a group consisting of plain, twill and satin style.

7. The infusion fabric of claim 1, wherein a first tow of said two tows has a yield A of between about 750 to about 2500 yards/pound and a second tow of said two tows has a yield B of between about 52 to about 450 yards/pound.

8. The infusion fabric of claim 1, further including a surfacing mat.

9. The infusion fabric of claim 8, wherein said mat is sandwiched between said surfacing mat and said woven roving or bonded reinforcement layer.

10. The infusion fabric of claim 1, wherein said continuous filament mat includes glass fibers selected from a group consisting of E-glass fibers, ECR-glass fibers and mixtures thereof, a binder and a size.

11. The infusion fabric of claim 10, including between about 80 and about 99 weight percent glass fibers, between about 1 and about 20 weight percent binder and between about 0.01 and about 2 weight percent size.

12. The infusion fabric of claim 11, wherein said glass fibers are provided as glass filament bundles.

13. The infusion fabric of claim 12, wherein said glass filament bundles include between about 20 and about 140 glass filaments per bundle.

14. The infusion fabric of claim 13, wherein said glass filaments of said glass filament bundles have a mean diameter of between about 11 and about 20 microns.

15. The infusion fabric of claim 14, wherein said glass filament bundles have a mean diameter of about 0.3048 mm and a diameter range of between about 0.127 and about 1.27 mm.

16. The infusion fabric of claim 11, wherein said binder is selected from a group of materials consisting of a polyester and an epoxy compatible binder.

17. The infusion fabric of claim 16, wherein said polyester binder is ground to a particle size of between about 25 to about 200 mm.

18. The infusion fabric of claim 17, wherein said binder also includes talc.

19. The infusion fabric of claim 17, wherein said binder also includes benzoyl peroxide.

20. The infusion fabric of claim 17, wherein said binder includes:
    between about 95 and about 99.8 weight percent polyester;
    between about 0.05 and about 3 weight percent talc; and
    between about 0.2 and about 2 weight percent benzoyl peroxide.

21. The infusion fabric of claim 10, wherein said continuous filament mat has a loop formation ratio of between about 2.0 to about 8.0 and a cure of between about 50 and about 100 percent when measured as acetone extractables.

22. An infusion fabric, comprising:
a continuous filament mat;
a first woven roving or bonded reinforcement layer including multiple parallel tows extending in a first direction; and
a second woven roving or bonded reinforcement layer including multiple parallel tows extending in a second direction at a bias to said first direction;
wherein at least two tows of said multiple parallel tows of one of said first woven roving or bonded reinforcement layer and said second woven roving or bonded reinforcement layer have differing yields so as to form spaced channels.

23. The infusion fabric of claim 22, wherein said mat and said first and second woven rovings or bonded reinforcement layers are stitched together.

24. The infusion fabric of claim 22, wherein said mat is constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid, ceramic fibers, thermoplastic polymer fibers, natural fibers and mixtures thereof.

25. The infusion fabric of claim 22, wherein said first and second woven rovings or bonded reinforcement layers are constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid, ceramic fibers, thermoplastic polymer fibers, natural fibers and mixtures thereof.

26. The infusion fabric of claim 25, wherein said first and second woven rovings or bonded reinforcement layers have an areal weight of between about 8 to about 60 ounces per square yard.

27. The infusion fabric of claim 26, wherein said first and second woven rovings or bonded reinforcement layers are selected from a group consisting of plain, twill and satin style.

28. The infusion fabric of claim 22, wherein at least two tows of said multiple parallel tows of said first woven roving or bonded reinforcement layer have differing yields so as to form spaced channels.

29. The infusion fabric of claim 22, wherein a first tow of said two tows of said first woven roving or bonded reinforcement layer has a yield A of between about 750 to about 2500 yards/pound and a second tow of said two tows of said first woven roving or bonded reinforcement layer has a yield B of between about 52 to about 450 yards/pound.

30. The infusion fabric of claim 22, further including a surfacing mat.

31. The infusion fabric of claim 30, wherein said mat is sandwiched between said surfacing mat and said first woven roving or bonded reinforcement layer.

32. The infusion fabric of claim 22, wherein said continuous filament mat includes glass fibers selected from a group consisting of E-glass fibers, ECR-glass fibers and mixtures thereof, a binder and a size.

33. The infusion fabric of claim 32, including between about 90 and about 98 weight percent glass fibers, between about 2 and about 10 weight percent binder and between about 0.1 and about 1 weight percent size.

34. The infusion fabric of claim 33, wherein said glass fibers are provided as glass filament bundles.

35. The infusion fabric of claim 34, wherein said glass filament bundles include between about 20 and about 140 glass filaments per bundle.

36. The infusion fabric of claim 35, wherein said glass filaments of said glass filament bundles have a mean diameter of between about 11 and about 20 microns.

37. The infusion fabric of claim 36, wherein said glass filament bundles have a mean diameter of about 0.3048 mm and a diameter range of between about 0.127 and about 1.27 mm.

38. The infusion fabric of claim 33, wherein said binder is a polyester.

39. The infusion fabric of claim 38, wherein said polyester binder is ground to a particle size of between about 25 to about 200 mm.

40. The infusion fabric of claim 39, wherein said binder also includes talc.

41. The infusion fabric of claim 39, wherein said binder also includes benzoyl peroxide.

42. The infusion fabric of claim 39, wherein said binder includes:
between about 95 and about 99.8 weight percent polyester;
between about 0.05 and about 3 weight percent talc; and
between about 0.2 and about 2 weight percent benzoyl peroxide.

43. The infusion fabric of claim 32, wherein said continuous filament mat has a loop formation ratio of between about 2.0 to about 8.0 and a cure of between about 50 and about 100 percent when measured as acetone extractables.

44. The infusion fabric of claim 22, wherein said at least two tows of said multiple parallel tows of said second woven roving or bonded reinforcement layer have differing yields so as to form spaced channels.

45. The infusion fabric of claim 44, wherein a first tow of said two tows of said second woven roving or bonded reinforcement layer has a yield between about 750 to about 2500 yards/pound and a second tow of said two tows of said second woven roving or bonded reinforcement layer has a yield between about 52 to about 450 yards/pound.

46. The infusion fabric of claim 22, wherein said second woven roving or bonded reinforcement layer is constructed from a material selected from a group consisting of glass fibers, carbon fibers, graphite fibers, vitreous carbon fibers, non-graphite carbon fibers, boron monolithic graphite fibers, boron monolithic non-graphite carbon fibers, silicone, aramid, ceramic fibers, thermoplastic polymer fibers, natural fibers and mixtures thereof.

47. The infusion fabric of claim 22, wherein said bias is approximately 90 degrees.

48. An infusion fabric comprising:
a mat selected from the group consisting of a continuous filament mat, a direct chopped mat, a direct continuous mat and combinations thereof;
a first woven roving or bonded reinforcement layer, said first woven roving or bonded reinforcement layer including multiple parallel tows in a first direction;
a second woven roving or bonded reinforcement layer, said second woven roving or bonded reinforcement layer including multiple parallel tows in a second direction at a bias to said first direction; and
wherein at least two tows of said first woven roving or bonded reinforcement layer and said second woven roving or bonded reinforcement layer have differing yields so as to form spaced channels.

49. The infusion fabric of claim 48, wherein a first tow of said two tows of said first woven roving or bonded reinforcement layer has a yield of between about 750 to about 2500 yards/pound and a second tow of said two tows of said first woven roving or bonded reinforcement fibers has a yield of between about 52 to about 450 yards/pound.

50. The infusion fabric of claim 48, wherein a first tow of said two tows of said second woven roving or bonded reinforcement layer has a yield of between about 750 to about 2500 yards/pound and a second tow of said two tows of said second woven roving or bonded reinforcement fibers has a yield of between about 52 to about 450 yards/pound.

51. The infusion fabric of claim 48, further including a surfacing mat.

52. The infusion fabric of claim 51, wherein said mat is sandwiched between said surfacing mat and said first woven roving or bonded reinforcement layer.

53. The infusion fabric of claim 48, wherein said first and second woven roving or bonded reinforcement layer has an areal weight of between about 8 to about 60 ounces per square yard.

54. The infusion fabric of claim 53, wherein said first and second woven rovings or bonded reinforcement layers are selected from the group consisting of plain, twill and satin style.

* * * * *